UNITED STATES PATENT OFFICE.

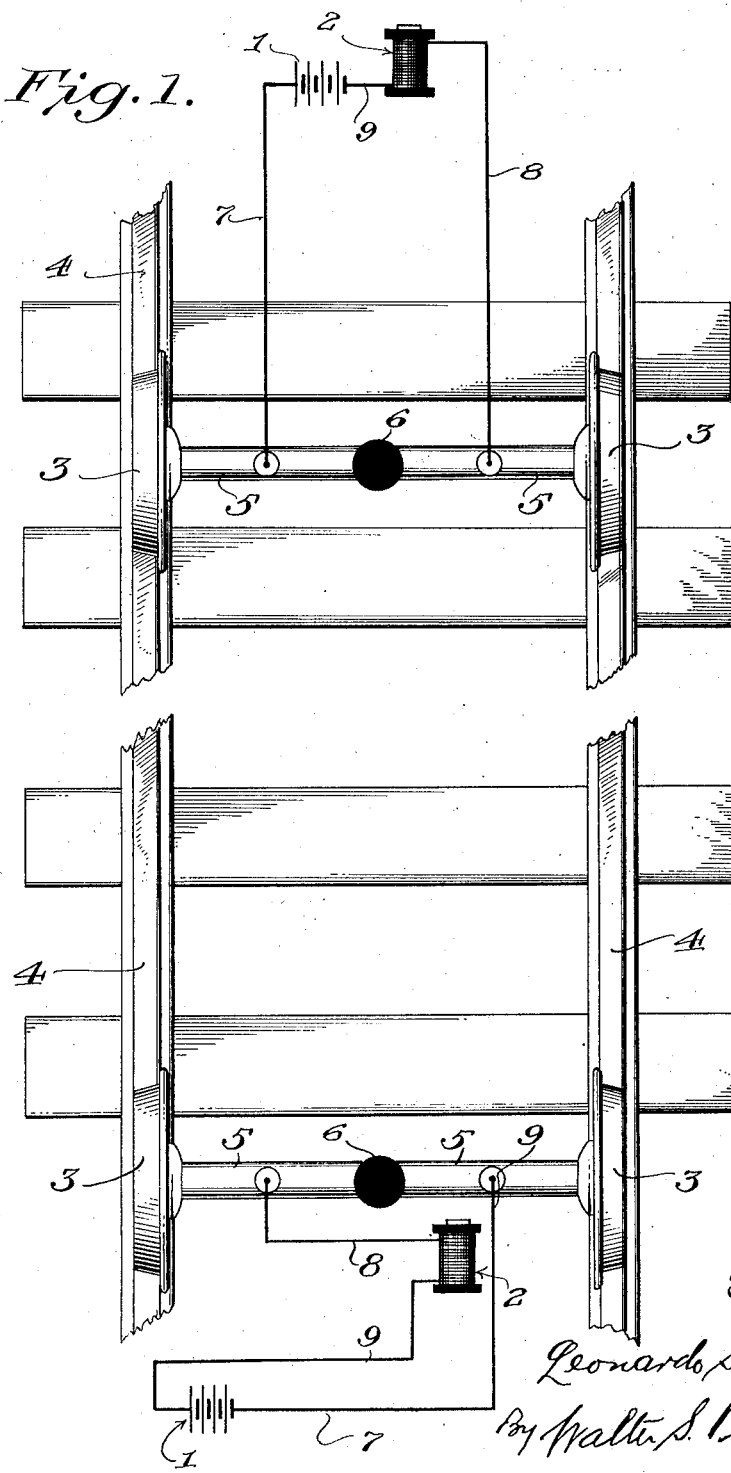

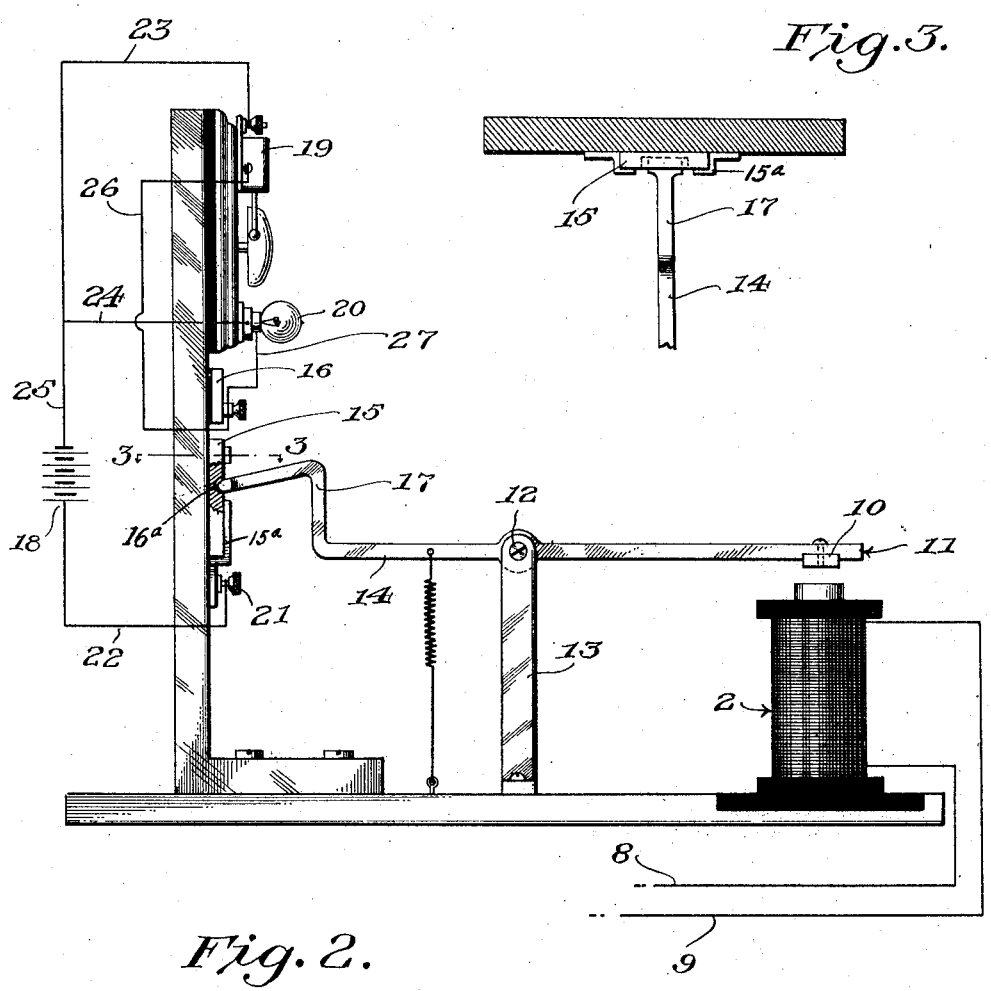

LEONARDO SANCHEZ, OF HABANA, CUBA, ASSIGNOR OF FORTY PER CENT. TO ALEXANDRO ANGULO AND TWENTY PER CENT. TO MIGUEL J. PALMER, BOTH OF HABANA, CUBA.

SAFETY ELECTRIC SIGNAL FOR RAILWAYS.

1,393,701.  Specification of Letters Patent.  Patented Oct. 11, 1921.

Application filed November 15, 1919. Serial No. 338,207.

*To all whom it may concern:*

Be it known that I, LEONARDO SANCHEZ, a citizen of the Republic of Cuba, and a resident of Habana, Cuba, have invented certain new and useful Improvements in Safety Electric Signals for Railways, of which the following is a specification.

The invention relates to a safety electric signal for railways.

The object of the present invention is to provide a simple, practical and efficient safety electric signal for railways adapted to be cheaply and easily installed on trains without interfering with the train controlling means or necessitating any alteration in the construction thereof, and capable when two locomotives or trains enter the same block or section of a track, of closing a signal circuit on each locomotive or train, and of operating visual and audible alarms for warning the engineer of each train that two trains have entered the same block or section so that proper steps may be taken to prevent a collision.

With these and other objects in view, the invention consists in the construction and novel combination and arrangement of parts hereinafter fully described, illustrated in the accompanying drawings and pointed out in the claims hereto appended, it being understood that various changes in the form, proportion, size and minor details of construction, within the scope of the claims, may be resorted to without departing from the spirit of the invention or sacrificing any of the advantages thereof.

In the drawings, in which like characters of reference designate corresponding parts in the several figures:—

Figure 1 is a diagrammatic view illustrating the normally open train circuits; and Fig. 2 is a side elevation of one of the train signal circuits, the battery connections being shown diagrammatically.

Fig. 3 is a cross section on line 3—3 of Fig. 2.

In the accompanying drawings, in which is illustrated the preferred embodiment of the invention, the safety electric signal comprises a normally open circuit designed to be installed on each locomotive or other portion of a train and comprises a battery 1 or other source of electric energy, an electro-magnet 2 and wheels 3 adapted to run on the rails 4 of the track and mounted on axle sections 5 which are insulated from each other at the center by suitable insulating material 6 which is interposed between the adjacent ends of the axle sections. The axle sections are connected by wires 7 and 8 with the battery and the electro-magnet respectively and the electro-magnet is connected with the battery by a wire 9. This construction provides a normally open circuit, and when two locomotives or trains equipped with the said normally open circuit enter the same block or section of a track, the normally open circuits will be closed through the rails 4 and a current will flow from the battery at the bottom of Fig. 1 along the wire 7 through the axle section 5 and wheel 3 and along the right hand rail to the wheel 3 at the same side of the track of the approaching train and through the wire 8 to the electro-magnet of such approaching train, and thence to the battery of such train. The current from the battery of such train will flow through the wires 7 along the left hand rail and through the wire 8 to the elecro-magnet at the bottom of Fig. 1 and thence to the battery. The open circuits are reversed on two approaching trains so that the wires 7 of one train is at the right hand rail while the wire 8 of the other train is adjacent and electrically connected with the right hand rail. This will cause both electro-magnets to be energized.

Each electro-magnet 2 has an armature 10 mounted on an arm 11 of a lever which is fulcrumed at an intermediate point at 12 on a suitable support 13. The other arm 14 of the intermediately pivoted lever is connected with a sliding contact 15 of a circuit closing device which is provided with a coacting fixed contact 16, preferably located above the sliding contact 15, as clearly shown in Fig. 2 of the drawing. The sliding contact which operates in guides 15ª is provided with a recess or socket 16ª into which the arm 14 extends and the said arm is provided with an angular bend or elbow extension 17 but the form of the lever may, of course, be varied, as will be readily understood. When the electro-magnet 2 is energized, the armature 10 will be attracted, and the armature 11 of the intermediately pivoted lever will be swung downwardly, thereby raising the other arm, and sliding the movable contact 15 upwardly into engagement with the fixed contact 16, thereby operating the circuit closing device and closing a signal circuit. The guides 15ª are spaced apart and the recess 16ª is located between the spaced guides to receive the elbow portion 17 of the lever. The slidable contact is located below the movable contact and it operates as a weight to maintain the armature of the lever normally spaced from the electromagnet. The signal circuit includes a battery 18, an electric bell 19 and a lamp 20. The circuit closure adjacent the sliding contact 15 has a terminal 21, which is connected by a wire 22 with the battery 18 and the bell which constitutes an audible signal and the lamp which is a visual signal are arranged in shunt and are connected by wires 23 and 24 with a wire 25 leading to the battery 18. The electric bell and the electric lamp are also connected by wires 26 and 27 with each fixed contact of the circuit closing device, suitable terminals being provided for the connection of such wires 26 and 27. It will thus be seen that when the signal circuit is closed a current will flow through the electric bell and the lamp and will cause the bell to ring and the lamp to glow so that an audible and a visual signal will be operated to warn the engineer of the fact that two trains have entered the same block or section of the track. This will enable the trains to be properly operated or controlled so as to avoid a collision. By arranging the signals in shunt, either or both may be operated by providing suitable switches for cutting one or the other out when desired. The blocks or sections may, of course, be of any desired length, and the rails will be insulated from the road bed and also from the rails of the adjacent blocks or sections, as will be readily understood.

What is claimed is:—

1. In a safety electric signal for railways, a circuit closing device having a vertical slidable contact forming a weight to hold the circuit closing device normally open, and an operating lever connected at one end with the circuit closing device and provided at the other end with an armature adapted to be attracted by an electromagnet to operate the circuit closing device.

2. In a safety electric signal for railways, a circuit closing device having fixed and movable contacts, the movable contact being slidable and forming a weight for holding the circuit closing device normally open, guiding means in which the movable contact operates, and operating means having an armature adapted to be attracted by an electromagnet for operating the circuit closing device.

3. In a safety electric signal for railways, a circuit closing device having fixed and movable contact the movable contact being slidably mounted below the fixed contact, and a lever having an armature adapted to be attracted by an electromagnet for actuating the movable contact, said movable contact operating as a weight to hold the armature normally spaced from the electromagnet.

4. In a safety electric signal for railways, a circuit closing device having fixed and movable contacts, the movable contact being slidably mounted, the slidable contact operating as a weight to maintain the circuit closing device normally open, and an intermediate pivoted lever having an armature at one arm arranged to be attracted by an electromagnet, the other arm of the lever being connected to and arranged to actuate the sliding contact.

5. In a safety electric signal for railways, a circuit closing device having fixed and movable contacts, the movable contact being slidably mounted and being located below the fixed contact and provided with a recess, said movable contact operating as a weight for normally maintaining the circuit closing device in an open position, and a lever provided with an armature adapted to be attracted by the electromagnet, said lever having a substantially elbow-shaped portion extending into the recess of the slidable contact.

In testimony whereof I have hereunto set my hand.

LEONARDO SANCHEZ.